United States Patent
Mace et al.

(10) Patent No.: US 9,553,824 B2
(45) Date of Patent: *Jan. 24, 2017

(54) TIME SYNCHRONIZED RESOURCE RESERVATION OVER PACKET SWITCHED NETWORKS

(71) Applicant: THOMSON LICENSING, Issy de Moulineaux (FR)

(72) Inventors: Gael Mace, Cholet (FR); Jean Le Roux, Rennes (FR); Claude Chapel, Thorigne-Fouillard (FR)

(73) Assignee: THOMSON LICENSING, Issy les Moulineaux (FR)

( * ) Notice: Subject to any disclaimer, the term of this patent is extended or adjusted under 35 U.S.C. 154(b) by 30 days.

This patent is subject to a terminal disclaimer.

(21) Appl. No.: 14/804,960

(22) Filed: Jul. 21, 2015

(65) Prior Publication Data

US 2015/0326493 A1    Nov. 12, 2015

Related U.S. Application Data

(62) Division of application No. 13/138,406, filed as application No. PCT/EP2010/051555 on Feb. 9, 2010, now Pat. No. 9,137,046.

(30) Foreign Application Priority Data

Feb. 20, 2009  (EP) .................................. 09305166

(51) Int. Cl.
*H04L 12/925* (2013.01)
*H04L 12/54* (2013.01)
(Continued)

(52) U.S. Cl.
CPC ......... *H04L 47/722* (2013.01); *H04L 12/5695* (2013.01); *H04L 47/801* (2013.01);
(Continued)

(58) Field of Classification Search
CPC .. H04L 12/5695; H04L 47/801; H04L 47/826; H04L 65/403; H04L 47/722; H04N 5/268; H04N 21/23424; H04N 21/4305; H04N 21/44016; H04N 21/6405; H04N 21/64322

See application file for complete search history.

(56) References Cited

U.S. PATENT DOCUMENTS 6,647,448 B1 * 11/2003 Brelin ................. H04L 67/32
710/107
2004/0228367 A1 * 11/2004 Mosig ............... H04L 29/06027
370/503

(Continued)

FOREIGN PATENT DOCUMENTS

CN        1953415        4/2007
CN        101179840      5/2008
(Continued)

OTHER PUBLICATIONS

Garner et al., "IEEE 802.1 AVB and Its Application in Carrier-Grade Ethernet [Standards Topics]", IEEE Communications Magazine, vol. 45, No. 12, Dec. 1, 2007, pp. 126-134.

(Continued)

*Primary Examiner* — Khoa Huynh
(74) *Attorney, Agent, or Firm* — Brian J. Dorini; Catherine A. Cooper

(57) ABSTRACT

A method is intended for scheduling reservations of resources in a packet-switched communication network comprising end-nodes (H1-H3) and core network switches (S1-S2). This method comprises the steps of:
including a time information to each request, issued by an end-node (H1) and forwarded by at least one core network switch (S1), and requesting a resource reservation for receiving a stream defined by specifications at a time which is represented by this time information, and (Continued)

storing the time information, which is included into each forwarded end-node request in correspondence with the associated stream specifications, into at least one related database managed by a core network switch (S1) which participates to the request forwarding.

8 Claims, 7 Drawing Sheets

(51) Int. Cl.
*H04L 12/927* (2013.01)
*H04L 12/911* (2013.01)
*H04N 21/234* (2011.01)
*H04N 21/43* (2011.01)
*H04N 21/44* (2011.01)
*H04N 5/268* (2006.01)
*H04N 21/6405* (2011.01)
*H04N 21/643* (2011.01)
*H04L 29/06* (2006.01)

(52) U.S. Cl.
CPC ..... *H04L 47/826* (2013.01); *H04N 21/23424* (2013.01); *H04N 21/4305* (2013.01); *H04N 21/44016* (2013.01); *H04L 65/403* (2013.01); *H04N 5/268* (2013.01); *H04N 21/6405* (2013.01); *H04N 21/64322* (2013.01)

(56) References Cited

U.S. PATENT DOCUMENTS

| | | | |
|---|---|---|---|
| 2004/0258003 A1* | 12/2004 | Kokot | H04L 12/185 370/254 |
| 2005/0076336 A1 | 4/2005 | Cutrell et al. | |
| 2007/0201513 A1 | 8/2007 | Anderson et al. | |
| 2008/0232243 A1* | 9/2008 | Oren | H04N 21/631 370/216 |
| 2008/0235699 A1 | 9/2008 | Jeong | |
| 2008/0288638 A1* | 11/2008 | Diab | H04L 12/2805 709/225 |
| 2008/0313682 A1 | 12/2008 | Kajiura | |

FOREIGN PATENT DOCUMENTS

| | | | |
|---|---|---|---|
| EP | 1429499 | 6/2004 | |
| FR | WO 2008113791 A1 * | 9/2008 | ............. H04N 5/268 |
| JP | 2006087014 | 3/2006 | |
| JP | 2008131247 | 6/2006 | |
| WO | WO9858518 | 12/1998 | |
| WO | WO0011838 | 3/2000 | |
| WO | WO2005060189 | 6/2005 | |
| WO | WO2008113791 | 9/2008 | |
| WO | WO2009012812 | 1/2009 | |

OTHER PUBLICATIONS

IEEE 802.1.org AV Bridging Task Group, The charter of the TG is to provide the specifications that will allow time-synchronized low latency streaming services through 802 networks. Retrieved Jul. 1, 2015.
IEEE Standards 802.1Q Virtual Bridged Local Area Networks 802.1QTM IEEE Standards for Local and metropolitan area networks IEEE Std 802.1QTM, 2003 Edition.
IEEE Standard for a Precision Clock Synchronization Protocol for Networked Measurement and Control SystemsIEEE Std 1588—2002.
IEEE Standard for Local and metropolitan area networksVirtual Bridged Local Area Networks Amendment 12: Forwarding and Queuing Enhancements for Time-Sensitive Streams, IEEE Computer Society Sponsored by the LAN/MAN Standards Committee Jan. 5, 2010.
IEEE Standard for Local and metropolitan area networksVirtual Bridged Local Area NetworksAmendment 14: Stream Reservation Protocol (SRP)IEEE Computer Society, Sep. 30, 2010.
IEEE Standard for Information technologyTelecommunications and information exchange between systems, Local and metropolitan area networks, Common specifications, Part 3: Media Access Control (MAC) Bridges ANSI/IEEE Std 802.1D, 1998 Edition.
IEEE Standard for Information technology 802.3—Telecommunications and information exchange between systemsSpecific requirements, Part 3: Carrier sense multiple access with Collision Detection (CSMA/CD) Access Method and Physical Layer Specifications, IEEE Computer Society Dec. 26, 2008.

* cited by examiner

TIME SYNCHRONIZED RESOURCE RESERVATION OVER PACKET SWITCHED NETWORKS

RELATED APPLICATIONS

This application is a divisional of co-pending U.S. application Ser. No. 13/138,406 filed Aug. 11, 2011, which is a 371 of International Application No. PCT/EP10/051555, filed Feb. 9, 2010, which claims the benefit of European Patent Application No. 09305166.2, filed on Feb. 20, 2009.

FIELD OF THE INVENTION

The present invention relates to the field of communication networks, and more precisely to resource reservation management over packet switched networks.

BACKGROUND OF THE INVENTION

Emerging standardization efforts, as in the IEEE organization, allow really considering strict resource reservation implementation at OSI level 2 (Link Layer). However, all these new mechanisms are not time correlated and thus do not allow to indicate the end-time of a current reservation or to schedule a future reservation.

In the present document the term "resource" relates to all network variables, such as bandwidth, jitter and latency, for instance, which characterize a data flow (or stream) between two nodes through a given infrastructure.

Some environments, such as professional video production and broadcast environments, are very time sensitive environment. So, it has been proposed to replace the point-to-point infrastructure they currently used with a packet switched network. But, this imposes to take care of about all latencies which could impact the overall system performances.

The well known OSI model (schematically illustrated in FIG. 1 and standardized by the ISO organization) defines a networking framework for implementing communication means in seven layers. Layers 1 to 4 are in charge of the transport of the data over a given communication medium, while layers 5 to 7 are used to allow different applications to communicate independently of the communication infrastructure used.

The present invention only concerns the OSI layer 2, i.e. the data link layer. So, all mechanisms described hereafter are handled at the OSI layer 2.

As it is known by the man skilled in the art, core network switches are core network equipments that forward traffic on information contained in the layer-2 header. This "forwarding" differs from "routing" which concerns operations on layer-3 information.

These core network switches only forward traffic to the addressees by using a forwarding table that associates a hardware address to one of their ports. When a frame is received by a core network switch, its layer-2 header gives the hardware address and thus an associated entry in the forwarding table, which designates the port to which the core network switch must forward the frame. Because they operate at a low level, network switches' processes are implemented in hardware, allowing mastering their latencies.

The IEEE 802.1 Audio/Video Bridging (AVB) Task Group (TG), which is part of IEEE 802.1, aims at providing specifications that will allow time-synchronized low latency streaming services through 802 networks. This TG comprises a sub-group "IEEE 802.1AS: Timing and Synchronization" which aims at defining through a standard Layer 2 time synchronizing service that is appropriate for the most stringent requirements of consumer electronics applications.

The 802.1AS standard specifies the protocol and procedures that must be used to ensure that the synchronization requirements are met for time sensitive applications, such as audio and video, across Bridged and Virtual Bridged Local Area Networks consisting of LAN media where the transmission delays are fixed and symmetrical, such as IEEE 802.3 full duplex links, for instance. This includes the maintenance of synchronized time during normal operation and following addition, removal or failure of network components and network reconfiguration. This 802.1AS standard specifies the use of IEEE 1588 specifications where applicable in the context of IEEE 802.1D and 802.1Q standards. Synchronization to an externally provided timing signal (e.g. a recognized timing standard such as UTC or TAI) is not part of this standard but is not precluded.

IEEE 802.1AVB task group comprises two other sub groups 802.1 Qat and 802.1 Qav concerning new resource reservation mechanism.

The 802.1Qat standard aims at defining an admission control system that allows bridges to guarantee the resources needed for Audio/Video (AV) streams. It specifies protocols, procedures and managed objects, usable by existing higher layer mechanisms, which allow network resources to be reserved for specific traffic streams traversing a bridged local area network. It identifies traffic streams to a level sufficient for switches to determine the required resources and provides a mechanism for dynamic maintenance of those resources.

This standard provides a signaling protocol to enable the end-to-end management of resource reservation for QoS guaranteed streams. The signaling protocol facilitates the registration, deregistration, and retention of resource reservation information in relevant network elements. The signaling protocol is an essential component for automatic configuration in bridged local area network applications that require latency and bandwidth guarantees. The application of current IEEE 802 technologies for high quality time sensitive streaming allows users to increase the load of their networks unknowingly to the extent that the user experience is negatively impacted. To provide the robust guaranteed QoS capability for streaming applications, the availability of network resources along the entire data path must be insured before transmission takes place. This requires the definition of traffic stream descriptors and a protocol to signal the resource reservation along the end-to-end path of streams. Multiple registration protocol (MRP) is used as a basis for this protocol.

The 802.1Qav standard aims at enhancing standard 802.1 bridge frame forwarding rules to support AV streams. It allows switches to provide guarantees for time-sensitive (i.e. bounded latency and delivery variation), loss-sensitive real-time audio video data transmission (AV traffic). It specifies per priority ingress metering, priority regeneration and timing-aware queue draining algorithms. Virtual Local Area Network (VLAN) tag encoded priority values are allocated, in aggregate, to segregate frames among controlled and non-controlled queues, allowing simultaneous support for both AV traffic and other bridged traffic over and between wired and wireless Local Area Networks (WLANs). This standard specifies enhancements to forward function of the above mentioned network switches (which are increasingly used to interconnect devices that support audio and video streaming applications) to provide performance guarantees allowing time-sensitive traffic in a local area network and harmonize delay, jitter and packet loss for Layer-2 networks.

The above mentioned new ongoing standardization efforts allow accurate synchronization connected network elements (end-node and core network equipment) and ensuring a strict resource reservation. Nevertheless, even if they aim at supporting time sensitive applications, they are not fully related because the resource reservation can not be scheduled according to the "wall" clock shared by any synchronized equipment.

SUMMARY OF THE INVENTION

So, the invention aims at proposing a time synchronized resource reservation management, based on the above mentioned emerging resource reservation and synchronization mechanisms, and allowing at least to minimize the delay between resource reservation and release, and to schedule resource reservation plan. Such a time synchronized resource reservation management implies a strict respect of the specified network variables (i.e. resources), which means that any modification of their respective values shall not be accepted in order to not affect the overall quality of service (QoS).

More precisely, the invention proposes to include time information to the resource reservation requests that are issued by end-nodes and forwarded by core network switches, and to the internal databases that are respectively managed by the core network switches to store information relative to resource reservations.

Still more precisely, the invention provides a method, intended for scheduling reservations of resources in a packet-switched communication network comprising end-nodes and core network switches (or equipments or else devices), and comprising the steps of:
- including a time information to each request, issued by an end-node and forwarded by at least one core network switch, and requesting a resource reservation for receiving a stream defined by specifications at a time which is represented by this time information, and
- storing the time information, which is included into each forwarded end-node request in correspondence with the associated stream specifications, into at least one related database managed by a core network switch which participates to the request forwarding.

The method according to the invention may include additional characteristics considered separately or combined, and notably:
- the time information may be derived from a time that is given by the wall clock shared by the end-nodes and the core network switches;
- the time information may be added to a multiple stream registration protocol data unit (MSRPDU), which constitutes an end-node request complying with the 802.1Qat standard, into a new dedicated field;
- the new dedicated field may be added to a sub-branch of the multiple stream registration protocol data unit, named "First Value", in parallel with the field named "StreamID" which defines an identifier of a stream.

The invention further proposes an end-node, intended for being connected to a packet-switched communication network comprising core network switches, and comprising a processing means arranged, each time it wants to request a resource reservation for receiving (or subscribing to) a stream defined by specifications, i) for generating a request including the stream specifications and a time information representing a time at which it wants to start to receive this stream, and ii) for transmitting the generated request to a core network switch to which it is connected, so that it could be forwarded to the other core network switches of the packet-switched communication network.

This processing means may be arranged for deriving the time information from a time which is given by the wall clock shared by the end-nodes and the core network switches of the packet-switched communication network.

The invention further proposes a core network switch, for a packet-switched communication network to which are connected end-nodes, which comprises a processing means arranged, when its core network switch has received a request issued by an end-node and including specifications of a stream and a time information representing a time at which it wants to start to receive this stream, for storing this time information in correspondence with the associated stream specifications into a related database of its core network switch, in order the latter be capable of forwarding the requested stream to the requesting end-node from the time represented by the corresponding stored time information.

BRIEF DESCRIPTION OF THE DRAWINGS

Other features and advantages of the invention will become apparent on examining the detailed specifications and the appended drawings, wherein.

DETAILED DESCRIPTION OF THE INVENTION

The appended drawings may serve not only to complete the invention, but also to contribute to its definition, if need be.

Figure 1:
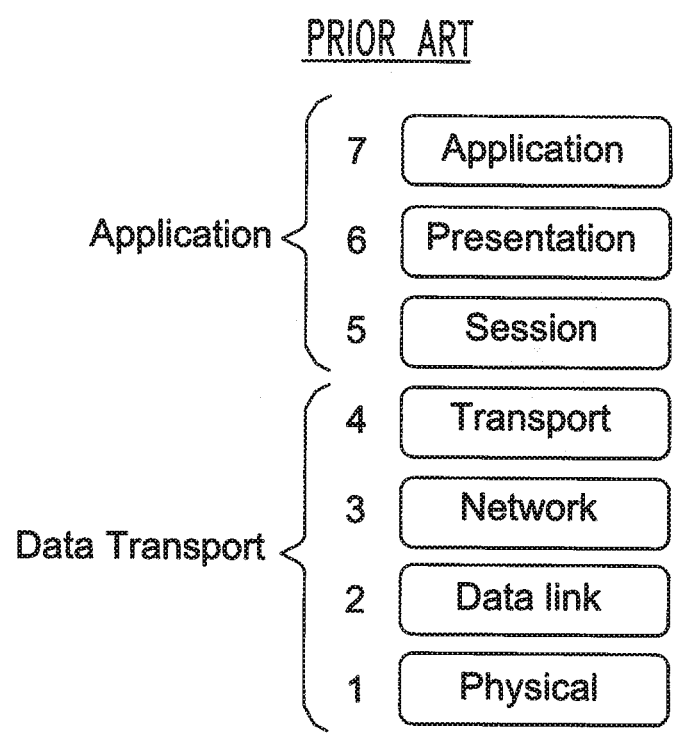
FIG. 1 schematically illustrates the layer arrangement of the OSI model.
Figure 2:
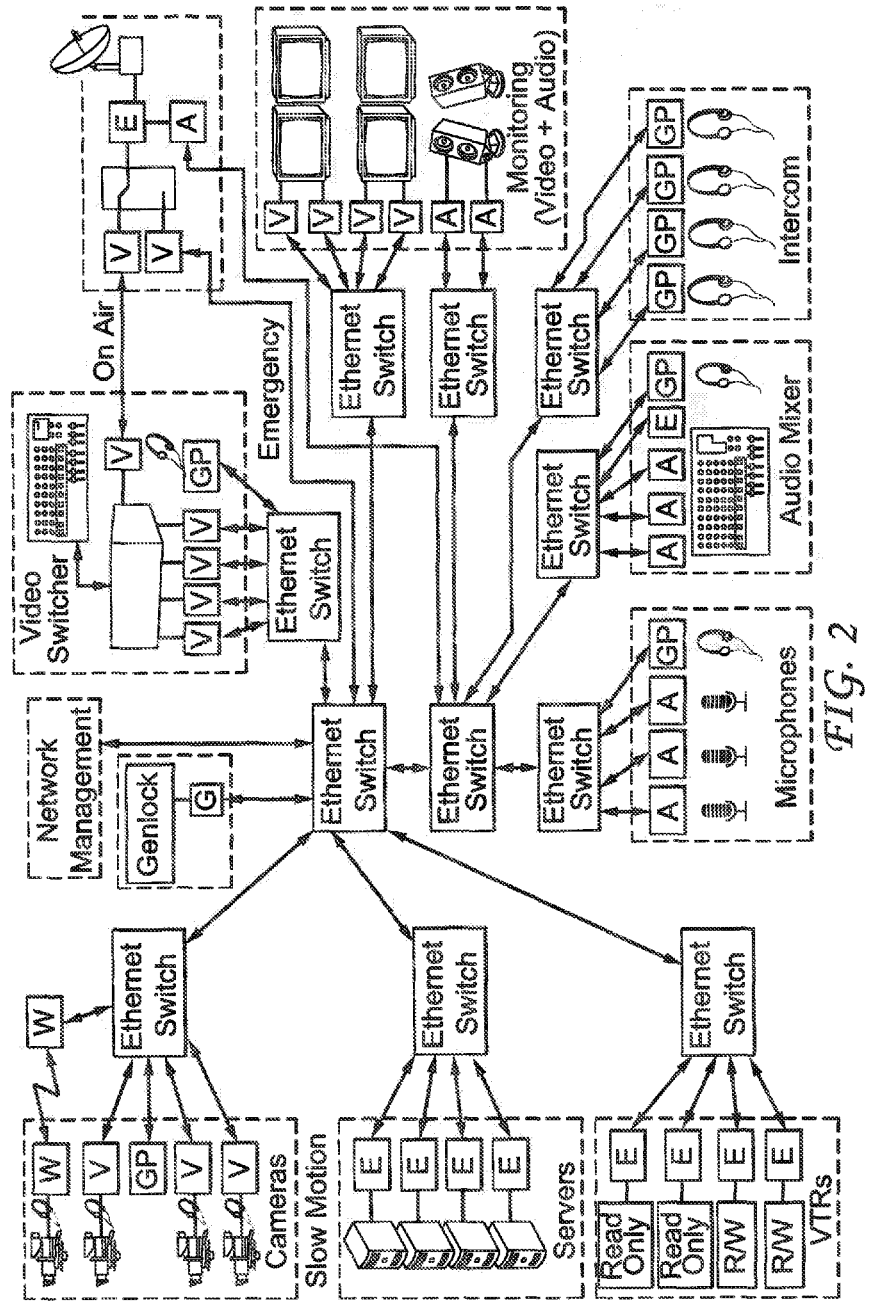
FIG. 2 schematically illustrates an example of Ethernet/IP networked studio production infrastructure, FIG. 3 schematically illustrates a simple LAN topology with the wall clock (left part) and its related Spanning Tree representation (right part), FIG. 4 schematically illustrates unsynchronized and synchronized release and reservation requests, FIG. 5 schematically illustrates a listener modified multiple stream registration PDU (MSRPDU) including a timestamp, FIG. 6 schematically illustrates an unsynchronized database evolution, and FIG. 7 schematically illustrates a synchronized database evolution according to the invention.

In the following description it will be considered that the packet switched (communication) network in which the invention is implemented is an Ethernet/IP local network infrastructure deployed for a professional audio/video production facility. An example of such an Ethernet/IP local network infrastructure is illustrated in FIG. 2.

This infrastructure comprises notably i) first end-nodes intended for producing or delivering audio and/or video contents in the form of data streams, such as cameras, servers, video tape recorders (VTRs), microphones, audio mixers, switchers, ii) second end-nodes intended for displaying video contents or television programs or for diffusing audio contents, such as televisions or loudspeakers, and iii) core network devices (or bridges), such as Ethernet switches, intended for forwarding the data streams provided by the first end-nodes through packets or protocol data units (PDUs).

It is recalled that a protocol data Unit (PDU) is a protocol packet sent by a connected host (or end-node (Hi)). Moreover a bridged protocol data Unit (BPDU) is a protocol packet sent by a connected core network's equipment (Sj).

When a first end-node, named talker, wants to provide data stream(s) to other (second) end-nodes, named listeners, interested by receiving this (these) data stream(s), it has to issue a stream declaration. A stream declaration allows each connected core network device (such as an Ethernet switch) to get the data stream specification (TSpec), such as talker Id, maximum bandwidth and maximum latency, and to initialize its own internal database related to resource reservation. But once the core network devices have initialized their respective internal databases, no resources are yet reserved.

Complete resource reservation and TSpec constraints checking are done when a listener has issued a "join" request to receive a previously declared stream. During this checking the resource reservation (previously issued) is compared to the current remaining amount of resources, and therefore the reservation may either fail or succeed. These situations are detailed hereafter with reference to FIGS. 3 and 4.

Figure 3:
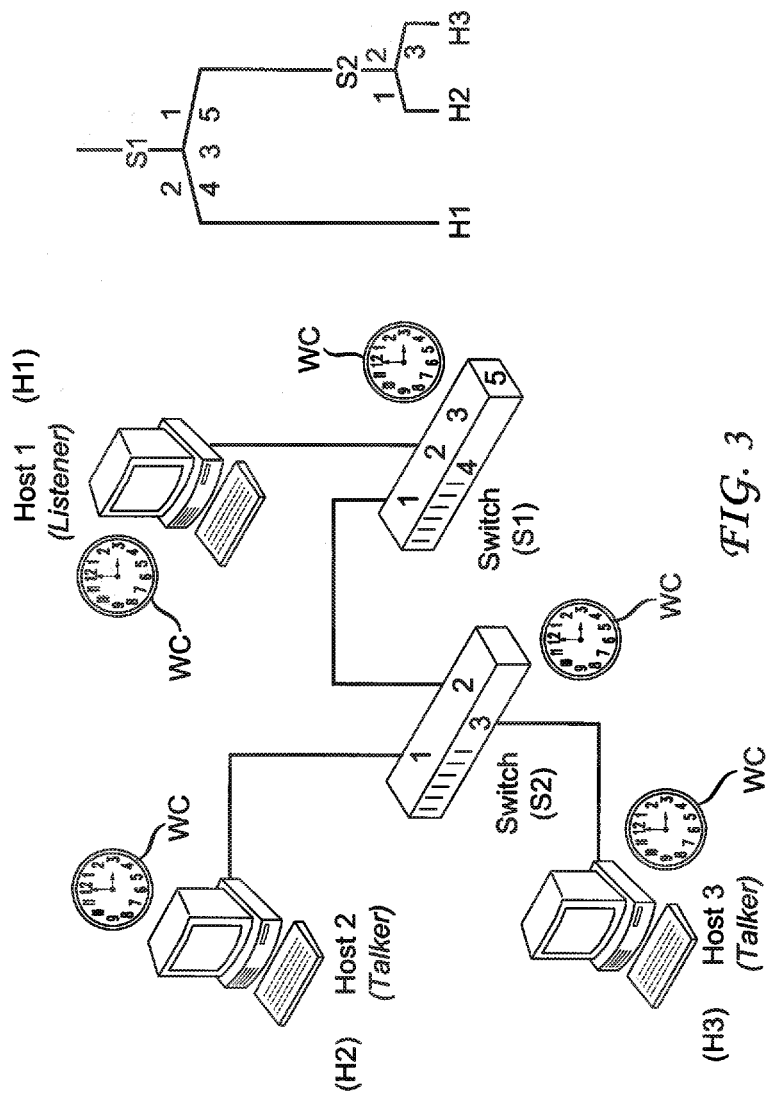

FIG. 3 schematically illustrates a simple synchronized network infrastructure supporting the above mentioned resource reservation processes. In this infrastructure end-nodes (or users) Host i (or Hi, here i=1 to 3 as example) are coupled therebetween through Ethernet switches Sj (here j=1 or 2 as example). The spanning tree representation of the infrastructure, located in the right part of FIG. 3, shows the switch port interconnections.

For instance, end-nodes H2 and H3 are talkers that have previously declared their respective (data) streams. So, end-node H1 is a listener which may request to reserve resources in order to receive the H2 stream and/or the H3 stream.

Figure 4:
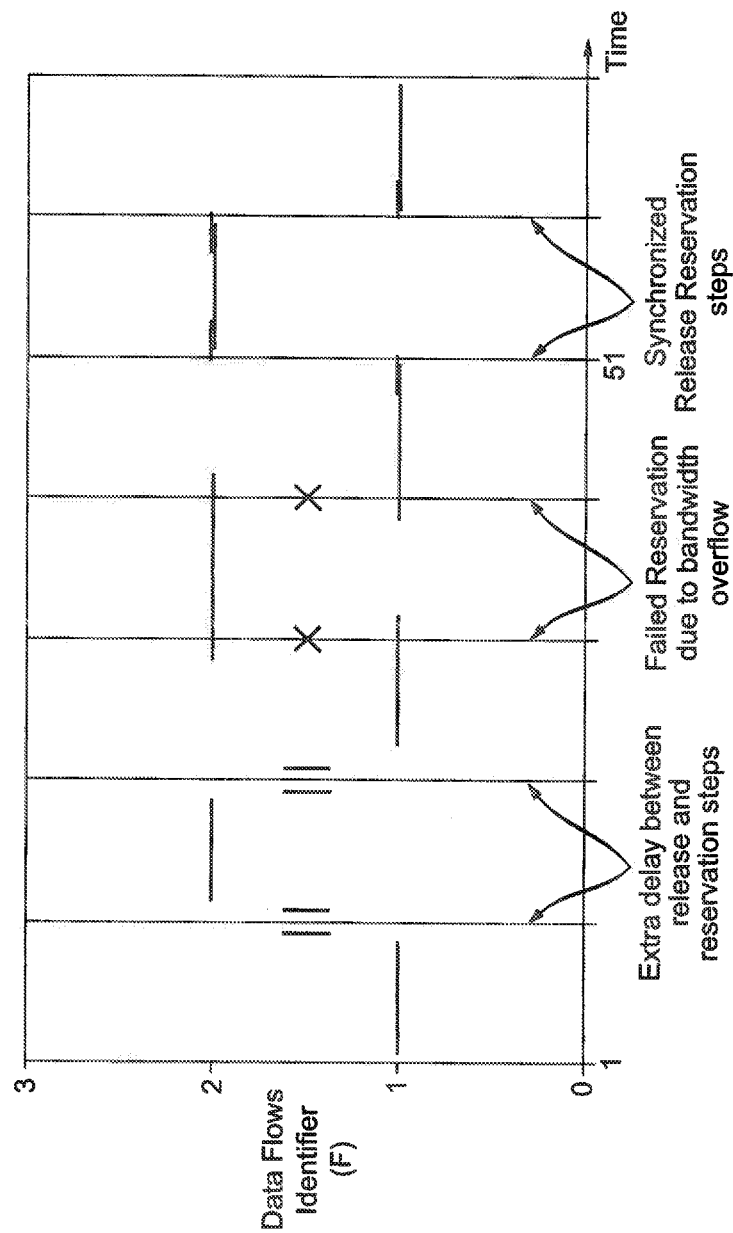

However, if the link between the switches S1 and S2 is not able to support H2 and H3 streams at the same time, the listener H1 will have to release the first requested stream (for instance H2 stream) to receive the second one (for instance H3 stream) to not exceed the maximum bandwidth. So, if the listener H1 is a video switcher, it is not able to handle a clean video switch between the two sources H2 and H3 due to the extra delay introduced by the consecutive release and reservation steps. FIG. 4 is a diagram illustrating unsynchronized and synchronized release and reservation requests as a function of time.

As mentioned before, emerging resource reservation mechanism such as those proposed by 802.1Qat and 802.1Qav standards do not allow scheduled release and reservation request.

Nevertheless emerging mechanisms allow setting up a very accurate time synchronization between every connected node of a network (or infrastructure). For instance, IEEE 1588 standard and the emerging IEEE 802.1 AS draft defining the IEEE 1588 profile over Ethernet (802.3) and Wifi (802.11) allow to reach 1 µs accuracy over a 7 hops bridged topology defining a single clock domain.

This time synchronization allows using a timestamp to define the date at which a listener node wants a release/reservation request (or message) to be taken into account in order to stop to subscribe to at least one stream and/or begin to subscribe to at least one other stream.

The expression "release/reservation request" means here either a stream release request or a stream reservation request or else a request intended for releasing resources for a first stream and reserving resources for a second stream.

More precisely, the invention proposes to include (or add) at least one time information (or timestamp) in the release and/or reservation request (for instance in protocol data unit (PDU)) to synchronize all the listener release and/or reservation requests. This timestamp is preferably derived from the time given by the wall clock WC that is shared by every connected device (end-nodes and core network equipments) and its width must meet the accuracy required by the considered application.

These timestamp addition and time derivation may be carried out by a first processing means that is associated to an end-node Hi, i.e. which is located into its associated end-node Hi. A first processing means can be made of software modules, at least partly, or of electronic circuit(s) or hardware modules, or else of a combination of hardware and software modules.

Figure 5:
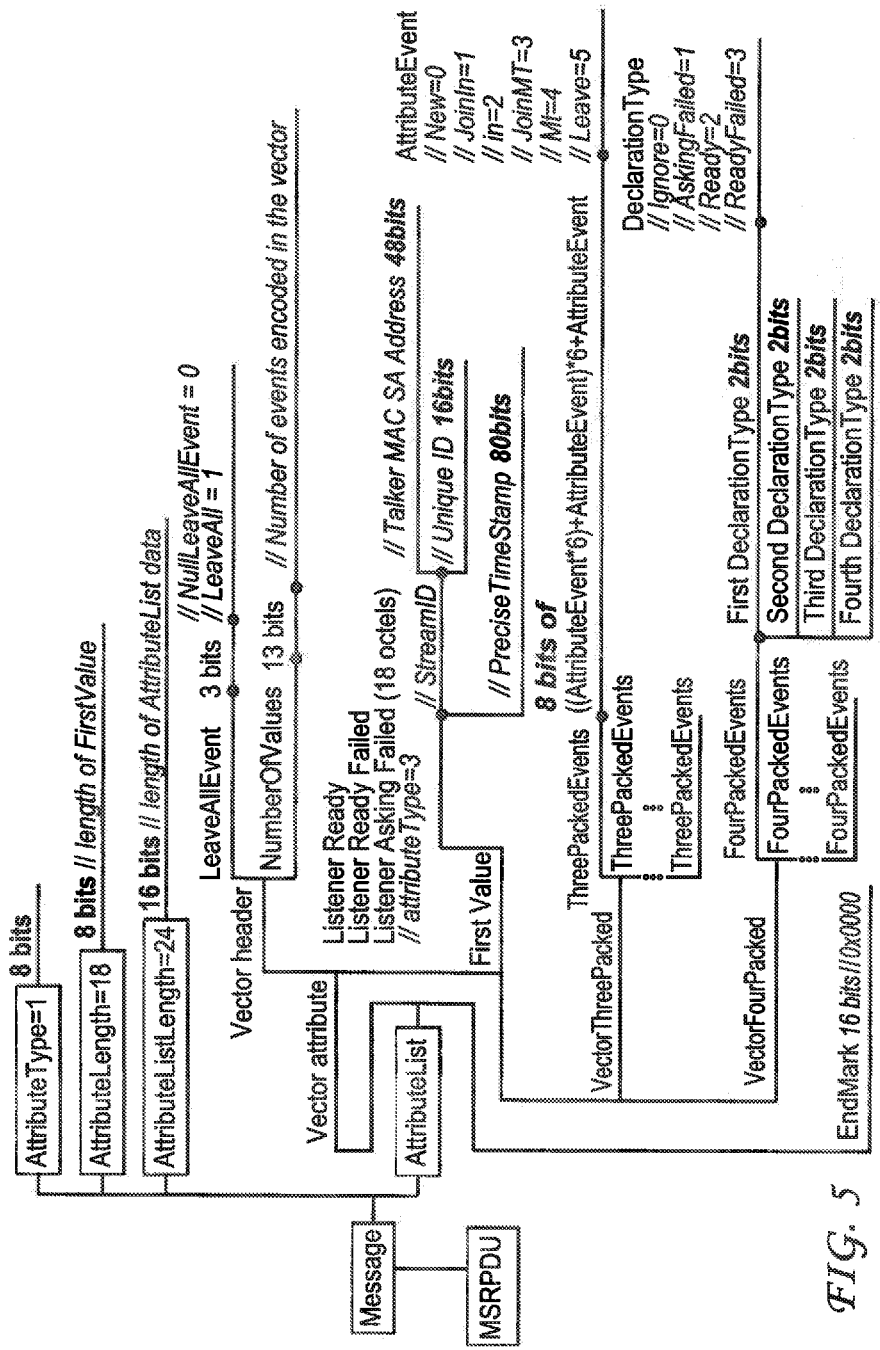

FIG. 5 illustrates a non limiting example of modified multiple stream registration PDU (MSRPDU) built from a multiple stream registration PDU (MSRPDU) defined by the 802.1 Qat draft and including a 802.1AS timestamp. In this example, the 802.1AS timestamp is located into the field named "PreciseTimeStamp" which is set in parallel with the field named "StreamID" (which defines the identifier of the stream to which belongs the MSRPDU) in the sub-branch named "First Value". In the illustrated example of FIG. 5, it is mentioned that the timestamp "PreciseTimeStamp" is defined by 80 bits. This results from the fact that in the 802.1AS standard a timestamp is defined by 80 bits. But, other numbers of bits may be used to define timestamps complying with other standards.

In the example of FIG. 5, the field "PreciseTimeStamp" being added to the "First Value" sub branch and being defined by 80 bits, the number of octets defining the field "Listener asking Failed" of this sub branch has to be modified. So, it is equal to 18 bytes (48 bits+16 bits+80 bits=144 bits=18 bytes). Moreover, this modification of a classical 802.1Qat MSRPDU forces other modifications and/or adjustments of the number of bytes defining some other fields such as "AttributeLength" and "AttributeListLength". For instance, the number of bytes defining the field AttributeLength may be set to 18 and the number of bytes defining the field AttributeListLength must be adjusted to 24.

To ensure a consistent and strict resource management, each core network equipment must update its own internal database each time a resource release/reservation request (or message) is received on one of its ports.

It is recalled that, when a core network device Sj receives a talker advertisement message (or talker advertise declaration TA), it adds an entry to its internal database and registers the stream characteristic (TSpec), defined into this received talker advertisement message, before forwarding this talker advertisement message to the other adjacent core network device (for instance switches) and end-nodes.

Moreover, when a core network device Sj receives a "listener ready" request or declaration (indicating that a listener end-node Hi is ready to receive a designated stream), it checks in its internal database if it contains information defining this designated stream and previously sent by a talker node by means of a talker advertisement message, and in the affirmative it checks if the status of this received listener ready request in terms of data stream specifications (notably the allocated bandwidth and maximum latency) fits the stored data stream specifications (or TSpec) of the designated stream.

In case of fit, the core network device forwards the listener ready request on the port associated to the considered registered talker advertisement message.

Figure 6:
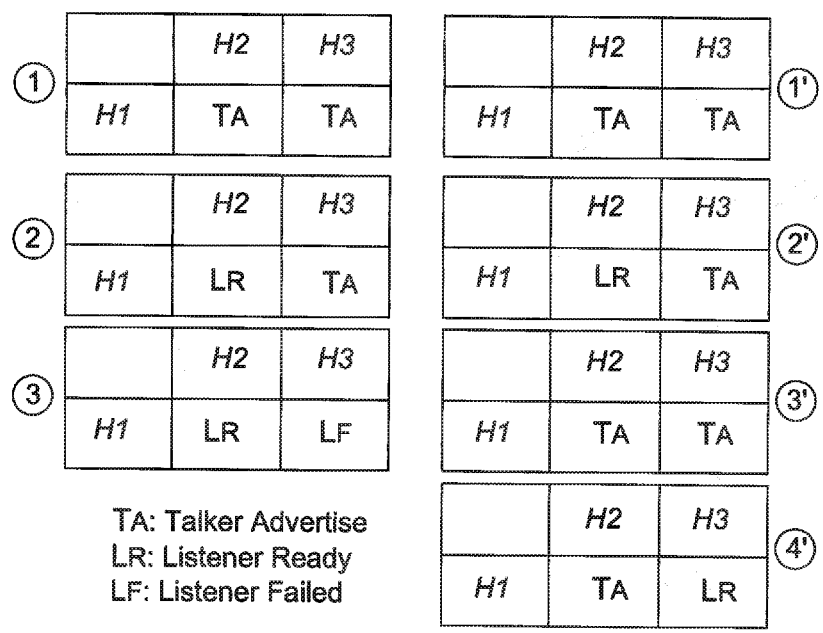

In case of unfit, the request is rejected and the notification of reject is forwarded to the talker node and the listener end-node. An example of such a rejection situation is shown in the three evolutions (1), (2) and (3) of an unsynchronized internal database illustrated in the left part of FIG. 6. In this example, TA designates a talker advertisement message (or Talker Advertise), LR designates a resource reservation (or "Listener Ready") request that has been sent by a listener end-node and which can be satisfied, and LF (or "Listener Failed") designates a listener node which has required a stream but cannot receive it because of unfit. In the first internal database (1) of a core network device, H1 designates the listener end-node, H2 designates a first talker end-node which has signaled that it was ready to sent a first stream, and H3 designates a second talker end-node which has signaled that it was ready to sent a second stream. In the second internal database (2) of this core network device, the latter has received a listener reservation request (LR) designating the first (H2) stream from end-node H1, and has checked and registered that it was possible to satisfy this request (LR). In the third internal database (3) of the same core network device, the latter has received a listener reservation request designating the second (H3) stream from end-node H1, and has discovered and registered that it was impossible to satisfy this request. So, the last reservation request of listener end-node H1 is rejected.

To avoid this rejection situation when there is no timestamping of the different listener end-node requests according to the invention, the listener end-node H1 must release the first (H2) requested stream to receive the second (H3) one, which introduces an extra delay. An example of such a release situation is shown in the four evolutions (1'), (2'), (3') and (4') of an unsynchronized internal database illustrated in the right part of FIG. 6.

In the first internal database (1') of a core network device, H1 designates the listener end-node, H2 designates a first talker end-node which has signaled that it was ready to sent a first stream, and H3 is a second talker end-node which has signaled that it was ready to sent a second stream. In the second internal database (2') of this core network device, the latter has received a first listener reservation request (LR) designating the first (H2) stream from end-node H1 and has checked and registered that it was possible to satisfy this first reservation request (LR). In the third internal database (3') of the same core network device, the latter has received a second listener reservation request designating the second (H3) stream from end-node H1 and has discovered that it was impossible to satisfy this second reservation request. So, the core network device has informed the listener end-node H1 of the situation, and the listener end-node H1 has sent a stream release request to release its first reservation request for the first (H2) stream. Then the core network device has updated its internal database (3') by replacing the LR information with a TA information. In the fourth internal database (4') of the core network device, the latter has received a second listener reservation request designating the second (H3) stream from end-node H1 and has checked and registered that it was now possible to satisfy this second reservation request.

According to the invention, by introducing a timestamp within the listener end-node requests, each core network device is able to treat them according to their respective timestamps, i.e. according to the instant at which they should be taken into account. In other words each listener end-node request, sent at a first time, comprises now a timestamp which has been added by an end-node first processing means and which defines a second time which will occur later and at which the listener end-node request will have to be taken into consideration (i.e. applied).

When a core network switch Sj receives a request, that has been issued by an end-node Hi and includes specifications of a stream and a time information representing a time at which it wants to start to receive this stream, a second processing means, associated to it (Sj), stores this time information in correspondence with the associated stream specifications into its related database, in order its associated core network switch Sj be capable of forwarding the requested stream to the requesting end-node Hi from the time that is represented by the corresponding stored time information.

The second processing means is located into its associated core network switch Sj. It can be made of software modules, at least partly, or of electronic circuit(s) or hardware modules, or else of a combination of hardware and software modules.

Figure 7:
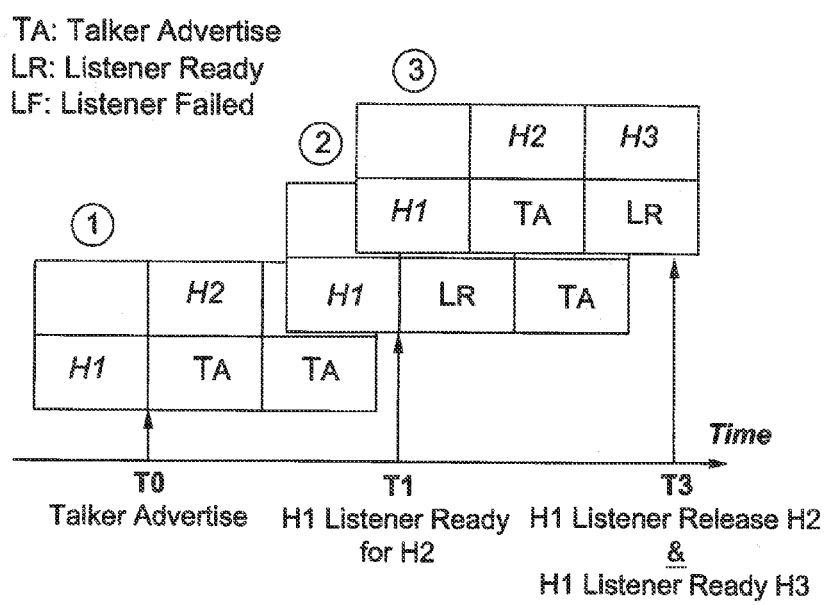

FIG. 7 illustrates an example of evolutions (1), (2) and (3) of an internal database of a core network device in case of a synchronized treatment according to the invention based on registered timestamps. In the first internal database (1) of a core network device, H1 designates the listener end-node, H2 designates a first talker end-node which has signaled that it was ready to sent a first stream from time T0, and H3 designates a second talker end-node which has signaled that it was ready to sent a second stream from time T0. In the second internal database (2) of this core network device, the latter i) has received a first listener reservation request (LR) from end-node H1, which designates the first (H2) stream and comprises a timestamp (T1>T0) defining the time at which end-node H1 wants its first reservation request to be satisfied, and ii) has checked and registered that it was possible to satisfy this first (H2) reservation request at time T1. In the third internal database (3) of the same core network device, the latter i) has received a second listener release and reservation request from end-node H1, which comprises a timestamp (T3>T1) defining the time T3 at which end-node H1 wants its first reservation request for the first (H2) stream to be released and the resource reservation for the second (H3) stream to be enforced, and ii) has checked and registered that it was possible to enforce this last (H3) resource reservation at time T3.

The invention is not limited to the embodiments of method, end-node and core network switch described above, only as examples, but it encompasses all alternative embodiments which may be considered by one skilled in the art within the scope of the claims hereafter.

The invention claimed is:

1. A method in a packet switched communication network, said method being performed at the data link layer level of the Open Systems Interconnection, OSI, model, said method comprising, at a first network node:
   receiving a request from a second network node for receiving a stream from a third network node, said request including time information at which said second network node wants to start receiving said stream;
   forwarding said request to said third network node based on said time information;
   receiving said stream from said third network node; and
   forwarding said stream to said second network node at a time corresponding to said time information.

2. The method according to claim 1, further comprising, prior to receiving a request from said second node, receiving a resource advertising message from said third network node, said request including a timestamp indicating a time at which said third node is ready to send a stream.

3. The method according to claim 1, further comprising, prior to starting forwarding said stream, inspecting resource availability.

4. The method according to claim 1, further comprising storing said time information.

5. The method according to claim 1, wherein the packet-switched communication network comprises end-nodes and core network switches, the first network node is an end-node and the second network node is a core network switch.

6. The method according to claim 5, wherein said time information is derived from a time given by a clock shared by said end-nodes and core network switches.

7. The method according to claim 5, wherein said time information is added to a multiple stream registration protocol data unit, which constitutes an end-node request complying with IEEE 802.1 Qat standard, into a dedicated field.

8. The method according to claim 7, wherein said dedicated field is added to a sub-branch of said multiple stream registration protocol data unit, named First Value, in parallel with a field named StreamID which defines an identifier of a stream.

* * * * *